United States Patent [19]

James

[11] Patent Number: 4,950,211
[45] Date of Patent: Aug. 21, 1990

[54] TRACK DRIVE SPROCKET WHEEL FOR SNOW GROOMING VEHICLE

[75] Inventor: M. Elmer James, Mendon, Utah

[73] Assignee: Logan Manufacturing Company, Logan, Utah

[21] Appl. No.: 422,024

[22] Filed: Oct. 16, 1989

[51] Int. Cl.$^5$ ............................................. F16H 55/30
[52] U.S. Cl. ................................... 474/152; 180/9.1; 474/901
[58] Field of Search ....................... 474/152, 153, 901; 180/9.0, 9.1, 9.62, 9.64

[56] References Cited

U.S. PATENT DOCUMENTS

| | | |
|---|---|---|
| Re. 30,018 | 6/1979 | Clemens et al. ................. 474/901 X |
| 3,093,006 | 6/1963 | Gamaunt ........................ 474/901 X |
| 3,736,032 | 5/1973 | Mosshart et al. ............... 474/901 X |
| 4,034,618 | 7/1977 | Groff et al. ..................... 474/901 X |
| 4,614,508 | 9/1986 | Kerivan ............................. 474/153 |
| 4,708,218 | 11/1987 | Makela ............................. 180/9.1 X |

Primary Examiner—Thuy M. Bui
Attorney, Agent, or Firm—A. Ray Osburn

[57] ABSTRACT

A continuous track drive sprocket wheel for snow traversing vehicles being adapted to reduce track instability and improve track retention upon the vehicles. The sprocket wheel has an enlarged toothed flange providing improved guiding contact with the grousers and utilizing contact with typical tire guides to increase belt stability and reduce grouser and belt stresses, as well as to increase sprocket wheel durability.

8 Claims, 5 Drawing Sheets

TRACK DRIVE SPROCKET WHEEL FOR SNOW GROOMING VEHICLE

BACKGROUND OF THE INVENTION

1. Field

The field of the invention is endless track drive systems for snow transversing vehicles, more particularly drive sockets wheels for such vehicles.

2. State of the Art

In contrast to traditional caterpillar vehicles, military tanks, and the like, vehicles for use upon snow are necessarily as light as possible and employ propulsion tracks having much greater ground-contacting areas. Substantially, the entire area beneath the vehicle body is occupied by the drive tracks, which typically extend both longitudinally and laterally beyond the vehicle to provide further bearing area. This large bearing area is needed both to secure traction upon the soft, easily sheared snow and to avoid undue sinking. The extremely wide tracks must nevertheless be as light as possible. Conflicting needs for large area and low weight has led to the use of tracks comprising thin, flexible, reinforced rubberoid belts with affixed transverse snow-engaging cleats called grousers. Such tracks are much lighter than the massive, transversely hinged metal tracks found on the above mentioned traditional vehicles. However, because of their great flexibility, further aggravated by plasticity and elasticity, these tracks are more difficult to retain upon the vehicle. Typically, the body of the vehicle is carried upon tire equipped bogie wheels which bear upon the bottom, ground contacting, driving portion of the belt. The upper, coasting portion rests upon the top of the bogie tires. Lateral forces from vehicle turning or operation upon laterally inclined snow surfaces tend to cause side slip of the belt across the bogies. This is countered by inwardly projecting upstanding pairs of tire guides provided upon each grouser, spaced laterally to accommodate the tires in between. Rearwardly of the bogies is a drive sprocket wheel, the teeth of which engage the grousers to propel the vehicle. Loss of the belted track off the vehicle at the bogies is a matter of real concern. The plastic creep of the belt precludes any great reliance upon high tension to hold it upon the bogies. Necessarily rather loosely strung, the belt may permit the restraining tire guides to be climbed by the bogie tires, even releasing the track assembly entirely from the vehicle. Heretofore, the drive sprocket wheel has been constructed of thin metal with rims of limited width, providing necessary strength and minimizing weight. For reduced wear of both the grousers and the sprocket wheel teeth, the grouser contacting portions of the teeth are typically coverd by a thin layer of hard plastic, which also greatly reduces the operating noise from the drive system. Such sprocket wheels adequately drive the track, but do little if anything to alleviate the belt stability problem, and their potentially helpful role if appropriately designed has not been recognized.

Clearly, a pressing need exists for a sprocket wheel designed to assure or at least contribute to the stability of the wide, lightweight highly flexible belt assemblies used on snow traversing vehicles.

SUMMARY OF THE INVENTION

With the foregoing in mind, the shortcomings and disadvantages of drive sprocket wheels for endless track vehicles operating on snow are eliminated or substantially alleviated by the present invention. An improved drive sprocket wheel is provided, comprising a vertical web carrying a flange defining equally spaced outstanding sprocket teeth, the root of each valley between the teeth being shaped and sized to provide a surface for contact with substantially the entire length of the grousers between the tire guide projections. Preferably, the flange also provides a pair of inclined, diverging side surfaces joined with the valley root surface at each end, each parallel to the facing surface of the adjacent tire guide projection, to restrain side-wise slipping of the track across the sprocket wheel. As previously discussed, lateral tilt of the track upon the bogies along its ground-contacting portion is an important cause of track instability, with the bogie tires tending to actually climb the tire guides. The sprocket wheel however is at somewhat higher elevation and is accordingly less affected in this manner. The firm direction provided by the above described sprocket configuration the, very importantly, provides a restoring force to the belt. Thus the stabilizing effects of the invention sprocket design are felt not only locally upon the belt, but throughout its ground contacting and bogie contacting portions.

Preferably, the inclined surfaces are each concave outwardly, defining a root and a pair of diverging sides, the latter providing with the adjacent body of the tooth a pair of shoulders. The shoulders bear upon the guide projections well above the grousers, and are thus placed to counter the tendencies for twist of the grouser about its length upon the belt. Both singly and in concert, these features significantly improve tract stability and retention upon the vehicle.

While the inventive sprocket wheel could be constructed entirely of metal, it preferably comprises a hard durable plastic flange defining the above described sprocket teeth configuration. The flange is cast entirely around the rim of a supporting wheel structure, the rim preferably defining the teeth in general configuration.

It is therefore the principal object of the invention to provide an improved sprocket wheel for driving the tracks of snow traversing vehicles, which contributes substantially to track stability upon the vehicle and also improves the sprocket wheel durability. These and other advantages will be evident from the following Detailed Description of Illustrated Embodiments.

BRIEF DESCRIPTION OF THE DRAWINGS

In the drawings, which represent the best mode presently contemplated for carrying out the invention.

DETAILED DESCRIPTION OF ILLUSTRATED EMBODIMENTS

Figure 1:
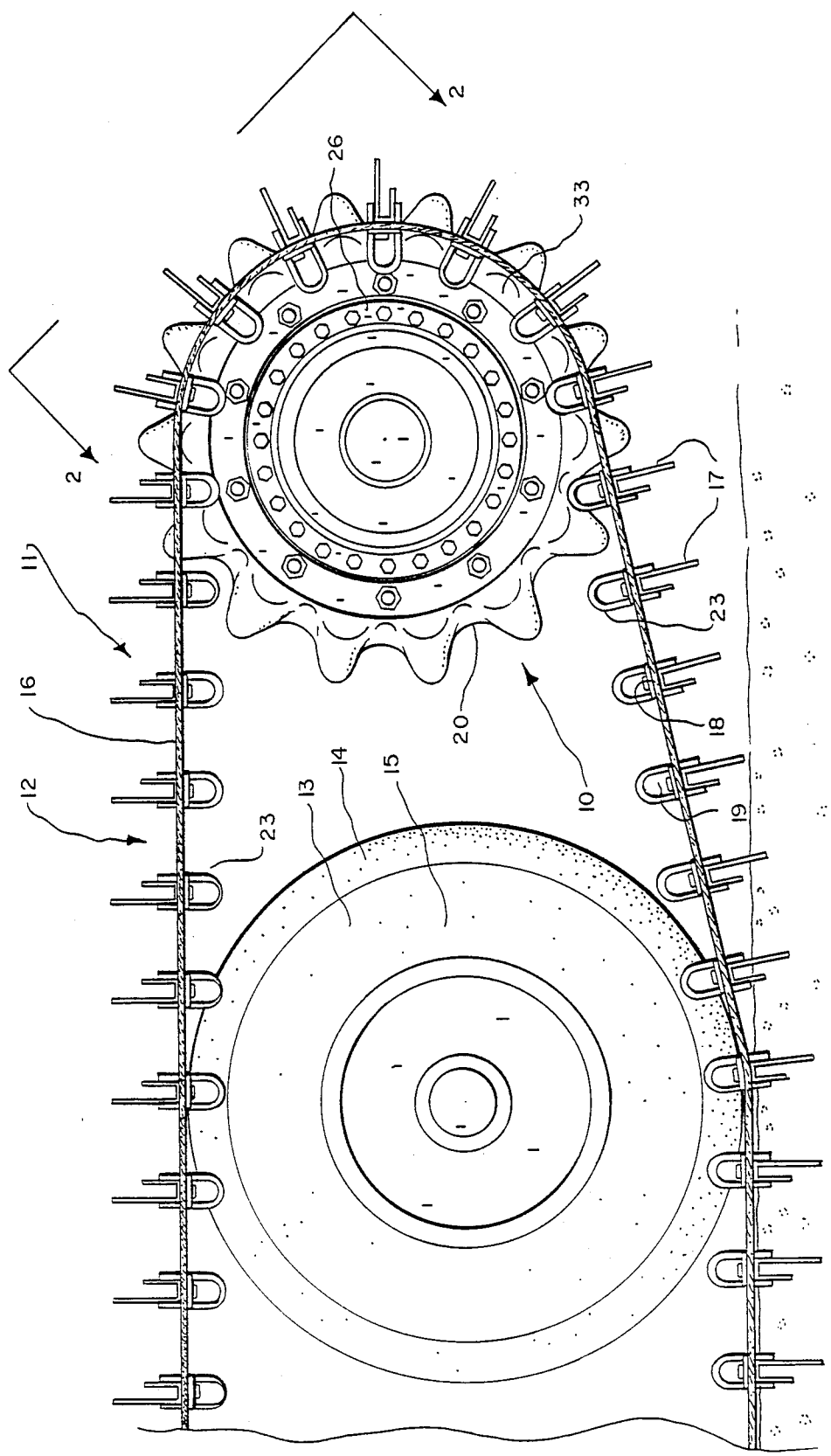
FIG. 1 is a side elevation view of a track drive sprocket wheel for snow grooming vehicles in accordance with the invention, shown in conjunction with a fragment of a vehicle carrying an endless track and track guiding bogie wheels, drawn to a reduced scale, FIG. 2 a view of a fragment of the vehicle of FIG. 1 from the exterior of the track, showing engagement of the grousers by the teeth of the sprocket wheel, taken along line 2—2 thereof, drawn to approximately the same scale.

In FIG. 1, a sprocket wheel assembly 10 in accordance with the invention is shown in use driving an endless track 11 of a snow grooming vehicle 12, shown fragmentally. Also shown is one of the load bearing, track guiding bogie wheel assemblies 13 comprising a rubberoid tire 14 and a wheel and hub structure 15. Typically, tire 14 is not penumatic, being rather designed more solidly to provide firm guiding forces without great distortion while continuing to absorb shock. Endless track 11 comprises one or more flexible rubberoid reinforced belts 16 to which are affixed at intervals cleat assemblies 17, called grousers hereinafter, secured to the belt as by plates 18 and bolts 19.

Figure 2:
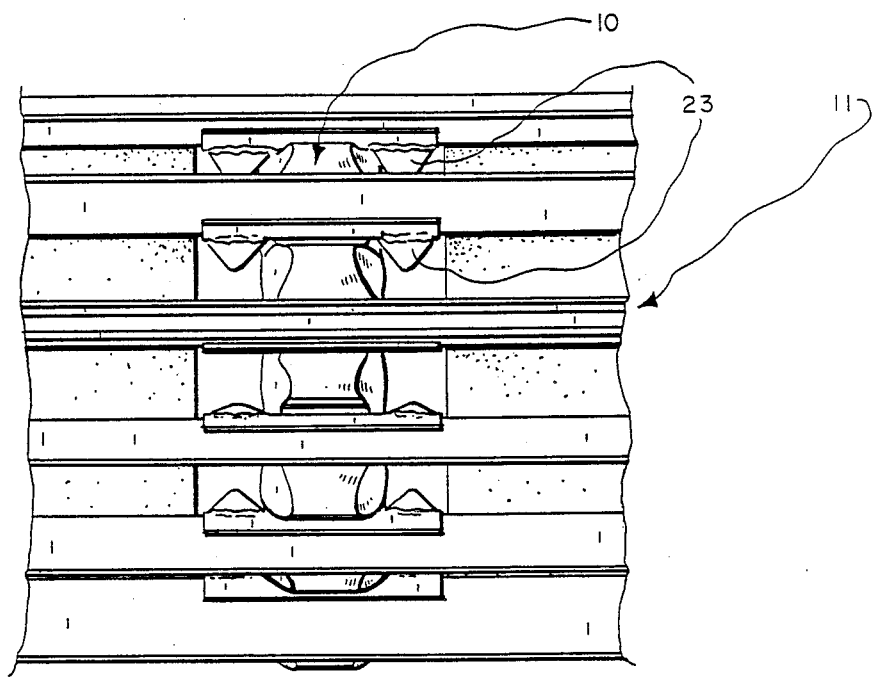

Sprocket wheel 10 is configured on its outermost periphery to engage a central section of each grouser 17 within valleys 20 between outstanding teeth 21. (FIGS. 2 and 3) To propel vehicle 12, torque power is applied to sprocket wheel 10, causing transverse surfaces 22 of sprocket teeth 21 to act against the grousers 17. This transfers shearing forces through the grousers into the ground, so that sprocket wheel 10 may rotate about its axle, translating itself and the vehicle along the ground.

This basic function of the sprocket wheel is found in all state of the art designs. However, existing sprocket wheel designs do not assist significantly in stabilizing track 11 upon the bogies 13, and are further designed with little apparent regard for their own durability.

To help keep track 11 in proper position, existing track designs incorporate pairs of tire guiding projections 23 spaced upstanding from each grouser 17. The projections 23 diverge inwardly to track 11, contacting bogie tires 14 as necessary. Projections 23 may be mounted upon a horizontal "U" member 24, in turn bolted to grouser 17 to provide the teeth contacting surfaces thereon. Sloping surfaces 25 are convexly curved to contact the tires 14 without damaging effect. The tire guides 23 engage tires 14 at both bottom and top portions of their peripheries, to restrain both driving and returning portions of track 11, at the ground and thereabove respectively.

Figure 7:
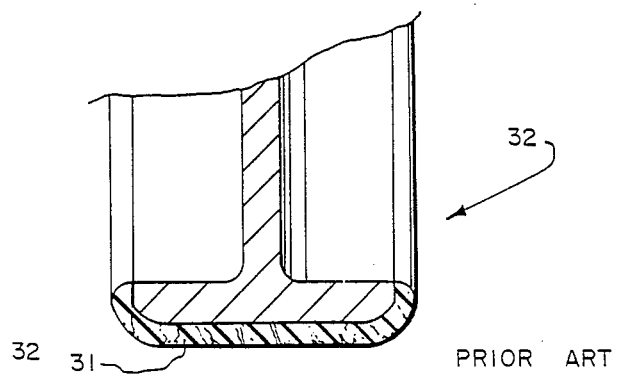

Heretofore, drive sprocket wheels have comprised a metallic wheel 26, having a web 27 with an outstanding rim 28 providing stiffness and strength, and having alternately outstanding teeth 29 and valleys 30. (FIG. 3) Typically, the outside periphery of the metallic drive sprocket wheels have been capped with a layer of hard urethane plastic 31 to reduce clanking from striking wheels and track metal parts and also to reduce the wear of both. See prior art FIG. 7, showing a fragmental cross section through a valley 30 of a prior art sprocket wheel assembly 32. Typically, fracture and loss of coating occurs as shown, especially at the corners, indicating the effect of uneven, concentrated grouser loads from track sidewise slide and tilt. Heretofore, the role of the drive sprocket wheel has been perceived as limited to its primary intended function of converting rotational power into translational power to propel the vehicle, and doing so as smoothly and efficiently as possible. Toward this end, great amounts of design and development ingenuity have been applied to the shapes of the sprocket teeth, roots and sides, for smooth engagement and release of the grousers. Eliminating or minimizing lateral grouser twist on the flexible belt has been another object of sprocket tooth design, for example; tendencies for abrupt snapping of the grousers into and out of seating position has multiplied belt stress and also has prompted much attention directed toward proper design of tooth and grouser shapes, as well as toward grouser mounting concepts promising improved resistance to loosening upon the belts. These considerations have obscured what is not realized, that the sprocket wheel also has potential for playing a very beneficial role in track guiding and retention. The design of sprocket wheel 10 exploits this guiding potential, contributes substantially to the long sought smoother grouser engagement and release and provides for vastly improved durability of the sprocket wheel itself.

Figure 3:
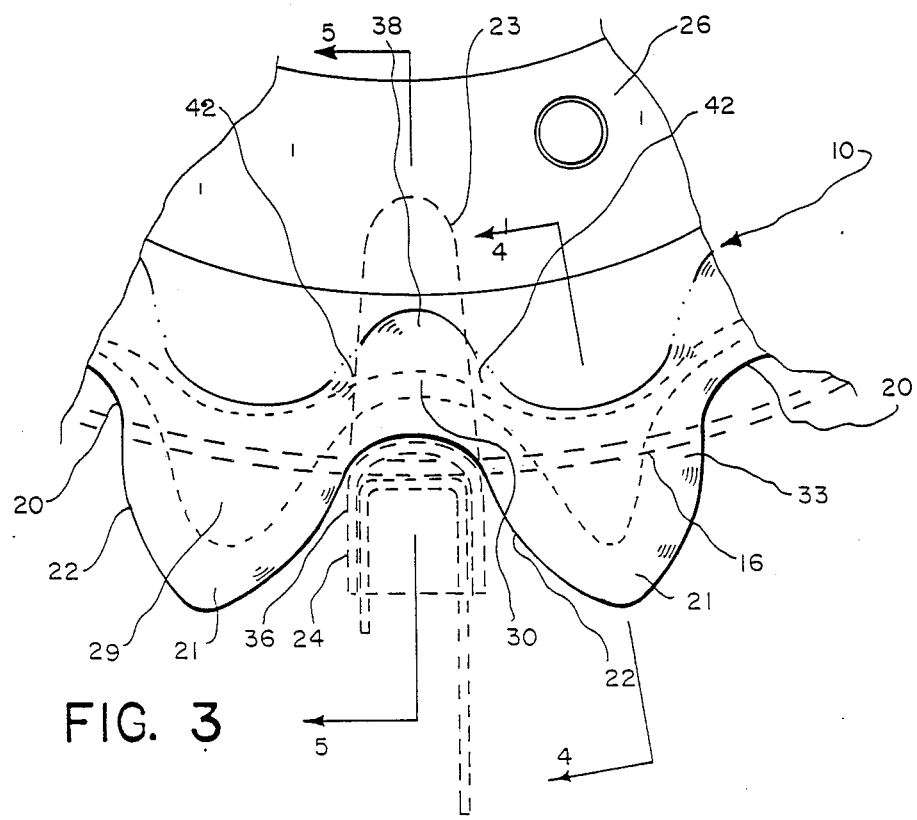
FIG. 3 a side elevation view of a fragment of the sprocket wheel of FIG. 1, illustrated in engagement with a fragement of the endless track including a grouser, drawn to a larger scale than FIG. 1, FIG. 4 a cross sectional view of the flange of the sprocket wheel of FIG. 3, taken along line 4—4 thereof through the tip of one of the teeth, drawn to the same scale, FIG. 5 a cross sectional view of the flange of the sprocket wheel of FIG. 3, taken along line 5—5 thereof through the grouser root between teeth, drawn to the same scale, FIG. 6 a cross sectional view of a fragment of the flange of the sprocket wheel of FIG. 5, taken across one of the tire guide roots at line 6—6 thereof, drawn to a slightly larger scale, FIG. 7 a cross sectional view of a fragment of a prior art drive sprocket wheel, taken through the grouser root thereof, drawn to the scale of FIG. 5, and FIG. 8 a perspective view of a fragment of the flange of the sprocket wheel of FIG. 1, drawn to the approximate scale of FIG. 3.
Figure 4:
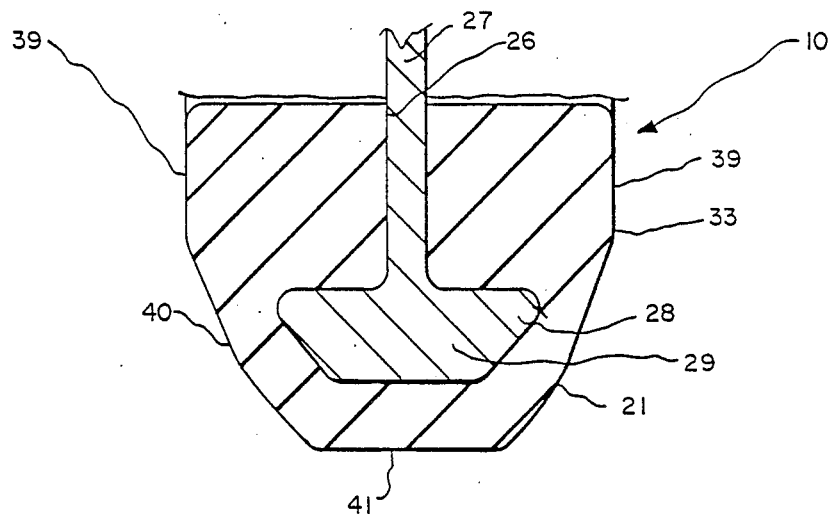
Figure 8:
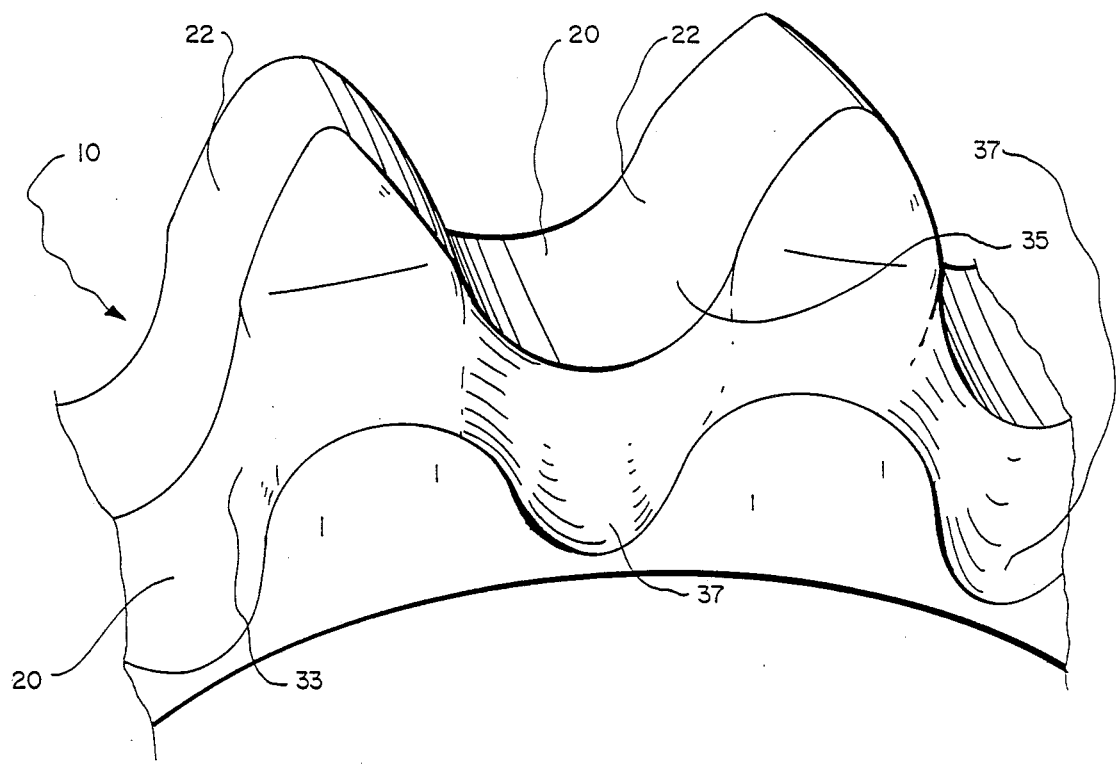

Drive Sprocket 10 comprises a prior art metallic wheel 26, provided however with a wide, deep flange 33 of hard durable plastic such as urethane, cast integrally around the entire metal rim and embracing also a portion of the web 27. Flange 33 carries sprocket teeth 21. Which are in side profile shaped for the above discussed smooth engagement and release of grousers 17. (FIGS. 3, 5 and 8)

Outwardly concave root channel 34 blends with outwardly diverging tooth sides 35, both carefully contoured to provide driving contact with the sides of the "U"-shaped horizontal tire guide member 24 bolted about grouser 17. In state of the art sprocket wheels, locally enhanced grouser stresses have been measured to coincide in time and location with engagement and disengagement of track and drive sprockets. This additional, unproductive stress is believed to come from driving force induced twisting of the grouser about its longitudinal axis. Ideally, all driving forces would be applied to grouser 17 in a direction and location coinciding with the plane of belt 16 at that point. If this were possible, it would effectively reduce much of the enhanced stress upon the belt and its connections to the grouser.

With the above in mind, sprocket wheel 10 is contoured between teeth 21 to provide, in addition to tooth root channel 34, a pair of outwardly concave tire guide channels 37. Roots 28 of additional channels 37 diverge from each other from the ends of grouser root 34 toward the axis of wheel 10, and are each parallel to the surface 25 of a facing guide projection 23. Each tooth 21 of flange 33 is contoured in cross section to provide a pair of vertical flat side portions 39 blending with inwardly converging side surfaces 40 of tips 41. (FIG. 5) Flats 39 form with each tire guide channel 37 a pair of shoulders 42, each of which engage surface 25 of projection 23 to counter the aforementioned grouser twisting. This is believed to greatly alleviate the measured heightened belt and grouser stresses, insuring smooth track engagement and disengagement from the teeth 21 of sprocket wheel 10.

Figure 5:
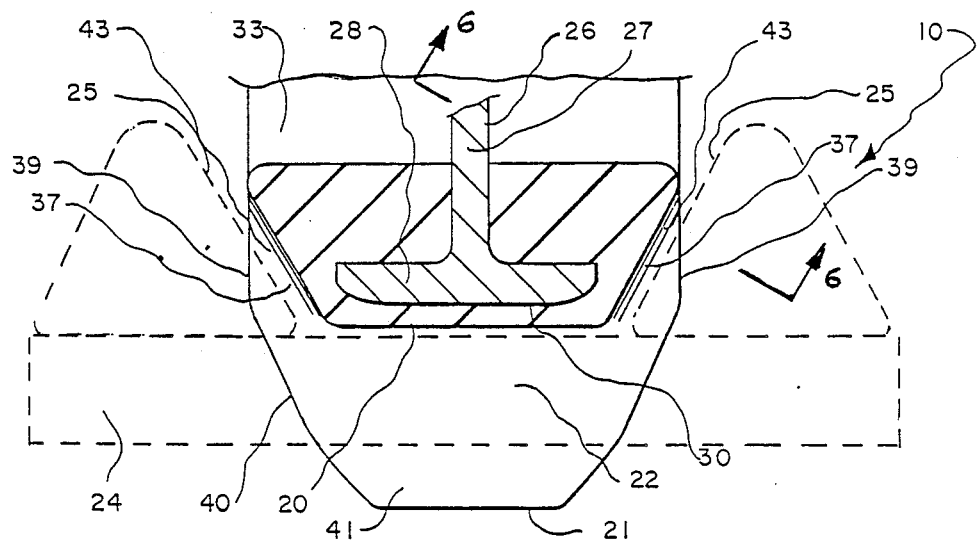
Figure 6:
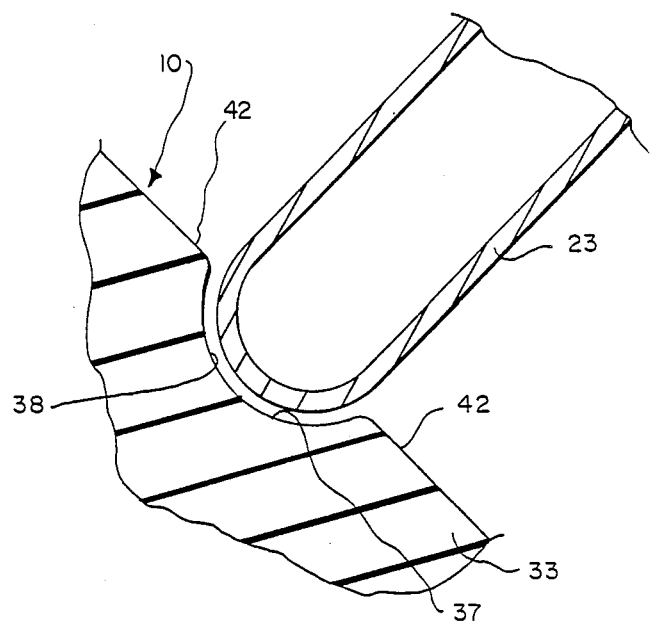

In cross-sectional profile radial to wheel 10 through the center of grouser engaging root 34, flange 33 is seen in FIG. 5 to have sufficient width and radial thickness to substantially occupy the entire lateral space between upstanding tire guide projections 23, shown in corresponding, dashed line profile. Lateral clearance space 43 is provided as minimally necessary for gravel and ice accommodation. This apparent clearance 43 between tire guide surfaces 25 and tire guide roots 38 deceptively indicates the absence of guiding contact. In reality, it is seldom that track 11 is so accurately centered and aligned upon sprocket wheel 10 as to avoid contact of one or the other or projections 23 with wheel flange 33. Side forces from even small angle vehicle turns, or operation of the vehicle on gentle lateral slopes, precipitates vehicle side-slide on tracks 11 into guiding contact of tire guide projections 23 with tires 14 and also sprocket flange 33.

Side slide of vehicle 12 upon tracks 11 tends to impel the vehicle into and up the sides of the tire guide projections 23, bogie tires 14 tending to climb thereupon at the ground-contacting, driving side of the track. Because the tooth periphery of drive sprocket wheel 10 is somewhat raised from the ground, the restraining effect of the sides of flange 33 upon the tire guides of the raised belt imparts an effective restoring force tending to replace vehicle 12 "back on track". Since prior art sprocket wheel designs permitted excessive unrestrained side movement of track 11 thereupon, no such restoring, stabilizing effect was seen.

Widened and deepened wheel flanges 33, in addition to countering grouser twist as described above, thus also provide improved restraint of slide-slip and tilt of track 11 upon vehicle 12. The lengthened grouser root 34 connects with tire guide roots 33 to form a significantly broadened base, greatly countering track tilt, and therefore increasing track stability. The longer lateral track support also reduces unit stresses on flange 33 from vehicle weight and impact loads, correspondingly improving durability. Perhaps of even more importance is the reduction of stress concentration at the ends of grouser root 34, a result of improved leverage against belt tilt provided by the aforementioned broader base area. Similar reductions in corner stresses result from replacement of the former abrupt, essentially right angled corners at the ends of the grouser roots 34 by much more gradual transitions through a smaller corner angle to the tire guide roots 38.

The invention may be embodied in still other specific forms without departing from the spirit or essential characteristics thereof. The present embodiment are, therefore, to be considered as illustrative and not restrictive, the scope of the invention being indicated by the appended claims rather than by the foregoing description, and all changes that come within the meaning and range of equivalency of the claims are, therefore, intended to be embraced therein.

What is claimed and desired to be secured by United States Letters Patent is:

1. A sprocket wheel for powering a continuous track of a snow traversing vehicle, the vehicle being supported upon the ground-engaging portion of the track by bogie wheels, the track comprising an endless loop of flexible belting having a side facing outwardly from and a side facing inwardly to the loop, elongate grousers secured transversely to the belt at equal intervals therealong, and a pair of spaced apart guiding projections mounted upon each grouser diverging inwardly to the loop to engage the bogie on its sides to restrain the track from movement lateral to the vehicle, said sprocket wheel comprising:

A metallic wheel member carrying a circumferential flange member defining a radially outward facing surface including valley and tooth side surfaces for engagement of substantially the entire length of the portion of each grouser between the guiding projections.

2. The sprocket wheel of claim 1, wherein the flange member further comprises:

a pair of surfaces diverging inwardly to the wheel, each parallel to the inwardly facing surface of the adjacent one of the guiding projections, and each joining the root of the grouser engaging valley, so that displacement of the track across the sprocket wheel is restrained by contact of one of the diverging surfaces on the flange with the surface of the adjacent guide projection.

3. The sprocket wheel of claim 2, wherein:

the wheel member comprises a metallic web carrying a metallic rim; and the flange member is constructed of hard durable plastic affixed in covering relationship to the metallic rim.

4. The sprocket wheel of claim 2, wherein:

the guide projection facing surfaces comprise a root and a pair of side surfaces diverging therefrom, said surfaces each forming with the surface of the adjacent tooth a shoulder placed to bear upon the adjacent side of the guide projection to restrain rotation of the grouser about its length lateral to the belt.

5. The sprocket wheel of claim 3, wherein:

the bogie facing surface of each guide projection is convexly curved;

the flange facing surface of the grouser portion between the guiding projections is convexly curved; and the grouser and the guide projection facing surfaces of the flange are each concavely curved.

6. The sprocket wheel of claim 5, wherein:

the wheel member comprises a metallic web carrying a metallic rim; and the flange member is constructed of hard durable plastic affixed in covering relationship to the metallic rim.

7. The sprocket wheel of claim 4, wherein:

the wheel member comprises a metallic web carrying a metallic rim; and the flange member is constructed of hard durable plastic affixed in covering relationship to the metallic rim.

8. The sprocket wheel of claim 1, wherein;

the wheel member comprises a metallic web carrying a metallic rim; and the flange member is constructed of hard durable plastic affixed in covering relationship to the metallic rim.

* * * * *